(12) United States Patent
Webber

(10) Patent No.: US 6,412,035 B1
(45) Date of Patent: Jun. 25, 2002

(54) APPARATUS AND METHOD FOR DECREASING THE RESPONSE TIMES OF INTERRUPT SERVICE ROUTINES

(75) Inventor: Victor Webber, Cupertino, CA (US)

(73) Assignee: Real Time, Inc., Santa Clara, CA (US)

( * ) Notice: Subject to any disclaimer, the term of this patent is extended or adjusted under 35 U.S.C. 154(b) by 0 days.

(21) Appl. No.: 09/015,584

(22) Filed: Jan. 29, 1998

Related U.S. Application Data

(60) Provisional application No. 60/037,112, filed on Feb. 3, 1997.

(51) Int. Cl.[7] .............................................. G06F 13/24
(52) U.S. Cl. ...................................... 710/261; 709/321
(58) Field of Search ................................ 710/260, 269, 710/261, 264, 265, 263, 262; 709/321–327, 200; 713/1, 2, 100

(56) References Cited

U.S. PATENT DOCUMENTS

| | | | | |
|---|---|---|---|---|
| 4,779,187 A | * | 10/1988 | Letwin ........................ | 712/229 |
| 5,027,273 A | * | 6/1991 | Letwin ........................ | 713/600 |
| 5,414,848 A | * | 5/1995 | Sandage et al. ............ | 709/107 |
| 5,530,858 A | * | 6/1996 | Stanley et al. .............. | 709/107 |
| 5,694,604 A | * | 12/1997 | Reiffin ........................ | 709/107 |
| 5,696,970 A | * | 12/1997 | Sandage et al. ............ | 709/301 |
| 5,742,825 A | * | 4/1998 | Mathur et al. .............. | 709/300 |
| 5,758,184 A | * | 5/1998 | Lucovsky et al. ............. | 710/6 |
| 5,802,280 A | * | 9/1998 | Cotichini et al. ........... | 709/200 |

OTHER PUBLICATIONS photo of "Disc 2" and pp. 262–267 of file "Kernel.doc" from the "Disc 2", of "Microsoft Develeper Network Development Platform—DDK, Windows 95", found at <cd drive>:\doc\kernel\kernel.doc; Dated: Jul., 1996.

* cited by examiner

*Primary Examiner*—St. John Courtenay, III
*Assistant Examiner*—Van H. Nguyen

(57) ABSTRACT

A method and system for allowing interrupt service routines to minimize the latency between the occurrence of a hardware interrupt signal and the execution of a modular interrupt service routine. In a preferred embodiment, a method for allowing modular interrupt service routines to be inserted in the hierarchy of a MS Windows protected mode operating system modules in a manner which minimizes the above mentioned latencies for the hardware interrupt request line 0 (IRQ 0). In another embodiment, a method for allowing modular interrupt service routines to be inserted in the hierarchy of MS Windows protected mode operating system modules in a manner which minimizes the above mentioned latencies for all hardware interrupt request lines (IRQs) signals other than IRQ 0.

19 Claims, 6 Drawing Sheets

VHKD_Begin_Min_Int_Period()

VHKD_Get_Real_Time()

VHKD_End_Min_Int_Period()

VHKD_Update_System_Clock()

APPARATUS AND METHOD FOR DECREASING THE RESPONSE TIMES OF INTERRUPT SERVICE ROUTINES

This patent application claims priority under 35 U.S.C of a prior provisional application entitled SYSTEM AND METHOD FOR INCREASING THE RESPONSE TIMES OF INTERRUPT SERVICE ROUTINES, Ser. No. 60/037, 112 filed on Feb. 3, 1997.

TECHNICAL FIELD

This invention relates to personal computer systems. More particularly, the present invention relates to personal computer systems running the Microsoft Windows family of operating systems.

BACKGROUND OF THE INVENTION

Personal computers running the MS-DOS operating system once dominated the market. Such systems usually run on the Intel 8088 series of microprocessors and allow for near instantaneous interrupt service routines (ISR) to be hooked into the system. These interrupt service routines running in this real-mode environment have a near zero latency interval between the occurrence of the hardware interrupt signal and the execution of the interrupt service routine and allow for the personal computer systems to be used in sophisticated real time tasks. With the advent of more powerful microprocessors and their more sophisticated operating systems, this near zero latency interrupt service routine became difficult to implement and became unavailable to the community of real-time developers.

The appearance of the Intel 80386 series of microprocessors which have additional protected modes and virtual memory paging modes precipitated a number of new products designed to exploit this more powerful environment. Quarterdeck Office Systems of Santa Monica, Calif. introduced a virtual machine manager (VMM) to take advantage of these modes, but the most successful introduction was protected mode Windows 3.1. This product has most of the operating system run in a kernel mode which allows greater unprotected access to the personal computer, vis-a-vis a protected mode where most of the applications run and which allows access to only a limited memory and I/O space of the personal computer. At this time technical difficulties arose in accommodating the transition from MS/PC-DOS to the Microsoft Windows environment, and the patents described below were issued for products to help in this area.

U.S. Pat. No. 4,974,159 to Hargrove, et. al. relates to the transition between the different modes of the Intel 80386 series of microprocessors when running MS/PC-DOS or MS Windows, and U.S. Pat. No. 9,459,869 to Spilo supposedly improves on Hargrove's transition mechanism. However, none of these patents addresses the issue of reduction of the response times of interrupt service routines (ISR) for hardware interrupt request lines (IRQs), and none of them use the Windows kernel fault hooking application programmatic interface (API) for hardware interrupts.

The Microsoft Windows family of operating systems provides a highly restrictive method for programmers to install an interrupt service routine. This method imposes a significant latency between the occurrence of the hardware signal causing the interrupt and the execution of the interrupt service routine in that the interrupt service routine (ISR) only runs after the virtual machine manager (VMM), the VPICD.386, and any other system software which is applicable to that particular hardware interrupt request line (IRQ) are loaded and execute.

Please consider the following example of how the Microsoft Windows protected mode operating systems loads in the series of ISRs for interrupt request line 0 (IRQ 0) at boot time for the personal computer. It is important to note that on personal computers IRQ 0 is always hardwired to a internal programmable timer device which must have register compatibility with an 8254 (Intel Corporation part number) programmable timer integrated circuit. First, the virtual machine manager (VMM) loads and creates ISRs (vectors) for all the interrupt descriptor table entries. The only function performed by these ISRs is to enable interrupts back on. The VMM exports services by providing a programmatic interface which Microsoft defines as fault hooking services, but which could be called interrupt hooking services, to other Microsoft kernel components to hook these VMM ISRs. These services, as the name implies, allows users to provide the programmatic interface an address or vector and have that address or vector called with the VMM ISR executs. However, the Microsoft documentation for third party developers describes these services as only capable of hooking a limited subset of specific software interrupts. Second, the VPICD.386 loads and hooks all of the VMM ISRs which represent IRQ lines connected to the 8259 device. The VPICD.386 then virtualizes the 8259 device. It arbitrates what other devices can hook these IRQs through services it provides to all other kernel components. Third, the VTD.386 loads and uses the VPICD.386 services to hook the interrupt for IRQ 0. The VTD.386 then virtualizes the internal programmable timer (8254 compatible device) and presents its timer services to other kernel components. One of the services presented by the VTD.386 is the ability to change the minimum interrupt period (MIP). The MIP is the frequency the occurrence of the 8254 interrupt and hence is the frequency at which various operating system scheduling is done. The greater this frequency, the more responsive and timely is the scheduling mechanism. This service of the VTD.386 greatly complicates this invention.

The important point in this background information is that the operating system provides no services for hooking hardware interrupts except those provided by VPICD.386. Hence, the latency of having the interrupt service routine execute through the VMM and the VPICD.386 is imposed on any user ISR. In the case the timer interrupt IRQ 0, we have the additional latency of the VTD.386 code. This invention describes how to avoid these latencies by inserting an ISR into the chain of execution prior to the VPICD.386 code.

FIG. 1 shows the execution flow of the invention, and this figure can also be used to imagine the flow of an unmodified IRQ 0 interrupt by connecting the VMM IRQ 0 ISR to the VPICD.386 IRQ 0 ISR and thus eliminating the VHKD.386 module.

Dr. Dobb's Sourcebook published a method to overcome this latency in the March/April issue of 1996 as detailed in an article authored by the author of this invention, V. Webber. A provisional patent application serial number 60/037,112 based upon this article was filed by the inventor of this patent application on Feb. 3 1997.

SUMMARY OF THE INVENTION

It is the object of the present invention to provide a fast hardware interrupt handling module which implements an improved method for inserting a hardware interrupt service routines (ISR) into the hierarchy of Microsoft Windows family of operating system modules for protected mode personal computers which creates a fast hardware interrupt service routine.

It is a further object of the present invention to minimize the latency interval from the occurrence of the hardware interrupt signal to the time of the execution of the interrupt service routine code for the fast hardware interrupt service routine.

It is a further object of the present invention to create a methodology for insertion of these fast hardware interrupt service routines so that it can be easily repeated.

It is a further object of the present invention to create a methodology so programmers can instantaneously transfer control from the fast hardware interrupt service routine to their hardware ISRs designed for their unique devices and exploit this environment of low latency. This methodology will allow this to be done with the standard published kernel application programmatic interface (API) of Windows and with this invention. Several modules of this invention use existing standard MS Windows kernel application programmatic interface calls designed to hook software interrupts to actually hook hardware interrupts. This is the first documented use of these function calls for the hardware interrupt hooking purpose.

These and other objectives will become apparent as the invention is described in greater detail.

DETAILED DESCRIPTION OF THE PREFERRED EMBODIMENT

Figure 1:
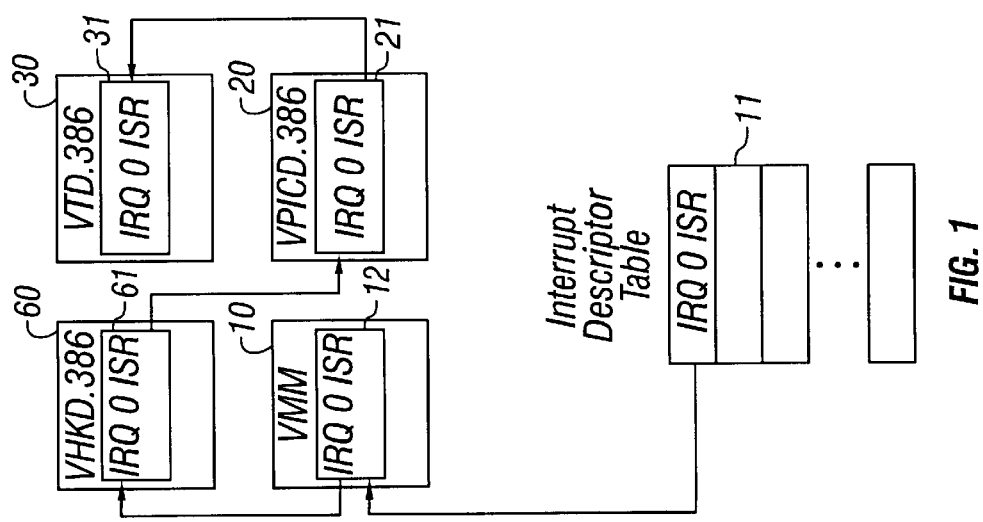
FIG. 1 shows the relationship between the Windows 95 operating system elements and the fast hardware interrupt service routine (fast ISR) for IRQ 0 elements used during the execution of the fast ISR which are contained in the fast hardware interrupt handling module (VHKD.386).

The preferred embodiment of this invention modifies the flow of a Windows 95 hardware interrupt request line for line 0 (IRQ 0) interrupt service routine (ISR). FIG. 1 shows how the ISR in a fast hardware interrupt handling module (VHKD.386 module (labeled 60)), which contains all the new code of this invention, is integrated with the rest of the operating system. A physical interrupt signal from an internal programmable timer (8254 compatible device) is physically connected to the interrupt line 1 of a 8259 device. This connection identifies the 8254 compatible device interrupt as IRQ 0, and when this hardware interrupt signal occurs the hardware portion of the interrupt mechanism uses a vector in a interrupt descriptor table (labeled 11) to locate the start of the interrupt service routine. An interrupt for hardware interrupt request line 0 (IRQ 0) begins in the interrupt descriptor table where a vector into a IRQ 0 ISR (labeled 12) in a Virtual Machine Manager (VMM) (labeled 10) exists. The interrupt service routine (ISR), or fault vector, for IRQ 0 in the VMM (labeled 12), contains code for enabling interrupts. The installation process of the IRQ 0 fast hardware interrupt service routine (fast ISR) replaces a preexisting fault vector in the VMM with a vector into the main module of this invention, VHKD.386 (60). The VHKD.386 IRQ 0 fast hardware interrupt service routine (fast ISR (labeled 61)) contains interrupt counting and tracking variables and is the place where the user inserts code written specifically to handle his devices and/or operations which require low latency and high frequency environment. The presentation to the user of a place where they can put a custom ISR which will be executed and the modification of the operation of the Windows operating system to provide this low latency high frequency interrupt handling environment represents the purpose of invention contained in VHKD.386.

The VHKD.386 module (60) (fast hardware interrupt handling module) contains data structures that define the state of the Windows 95 IRQ 0 environment prior to installation of the invention, and data structures that define the current VHKD modifications to this environment. The information falls into two main structures: a fast ISR for IRQ 0 information structure or a fast ISR structure, and an array of minimum interrupt period structures or a MIP array, both of which are described below.

The information in the fast ISR structure includes the following. This structure contains a field for the fast ISR timer ticks. This is a count of timer ticks for the 8254 compatible device which needs to be loaded on every interrupt in order to cause the 8254 compatible device to interrupt at the fast ISR frequency. This structure contains a pointer to the current minimum interrupt period (MIP). The current minimum interrupt period is consulted by the fast ISR for IRQ 0 to know when it needs to pass control to the original vector. The fast ISR structure also contains a field that represents the total timer ticks. This is a field that contains a total of all the 8254 compatible device timer ticks that have occurred since the system was booted. The fast ISR structure also contains a field that represents the total 8254 compatible device timer ticks that have a occurred for a single minimum interrupt period (MIP). A single minimum interrupt period consists of several occurrences of a fast ISR. The fast ISR structure also contains a field of preexisting IRQ 0 fault vectors: a VMM mode fault vector, a PM mode fault vector, a V86 mode fault vector. These are the vectors called by the fast ISR when it emulates a minimum interrupt period. The fast ISR structure also contains a fast ISR frequency counter. This counts the number of fast ISRs which have occurred since the last minimum interrupt period (MIP). It is reset when the fault vectors are called to mimic the minimum interrupt period.

An array of minimum interrupt period structures (MIP array) contains several instances of a MIP structures which represent all the minimum interrupt periods which have been requested by users of the system. This is a memory of all the requests to change the minimum interrupt period which were valid. The MIP structure contains several fields. It contains a field with the minimum interrupt period represented in millisecs. It contains a field with the minimum interrupt period represented in 8254 compatible device timer ticks. This represents the number of 8254 compatible device timer ticks which would be programmed into the 8254 compatible device if the fast ISR did not exist. It contains a field with the minimum interrupt period represented in fast ISR frequency marks. In other words, a field representing the number of fast ISRs which must occur before the fast ISR passes control to the original vector. The passing on of the vector is an effort to emulate the environment where 8254 compatible device was programmed to interrupt solely as a function of this minimum interrupt period, without any fast ISR installed.

The different MIP structures can have different priorities and functionality. The most important distinction is which MIP structure represents the current active minimum interrupt period. This distinction changes as requests are made to add and delete minimum interrupt periods when a MIP structure represents the current active minimum interrupt period the internal fields acquire different meanings. The frequency mark field is referred to as the current frequency mark. Also, one of the elements in the array represents the minimum interrupt period which was active when the fast ISR was installed. Unlike the other MIP structures which are added and removed through functions which are discussed later, the original frequency mark must always be maintained for eventual reloading into the system.

Referring again to FIG. 1, the preexisting VMM mode fault vectors all lead to the VPICD.386 (labeled 20). When the VPICD.386 module started, it hooked all of the IRQs in the interrupt descriptor table which were associated with the programmable interrupt controller. It then became the arbiter of these fault vectors. The VPICD.386 IRQ 0 ISR fault vector (labeled 21) is the vector associated with the 8254 compatible device, although, this fault vector knows nothing about where the IRQ originates from and this fault vector only contains code to enable the 8259 device to accept more interrupts.

When the VTD.386 module (labeled 30) loads, it uses the services of the VPICD.386 to link itself into, or hook the IRQ 0 interrupt. Hence the VPICD.386 IRQ 0 ISR fault vector points to the VTD.386 module. The VTD.386 IRQ 0 ISR fault vector contains code which performs bookeeping for the 8254 compatible device. Specifically, the VTD.386 IRQ 0 ISR contains code which performs functions which need to execute at the interrupt frequencies which the VTD.386 module thinks the 8254 compatible device is programmed to interrupt at.

Figure 2:
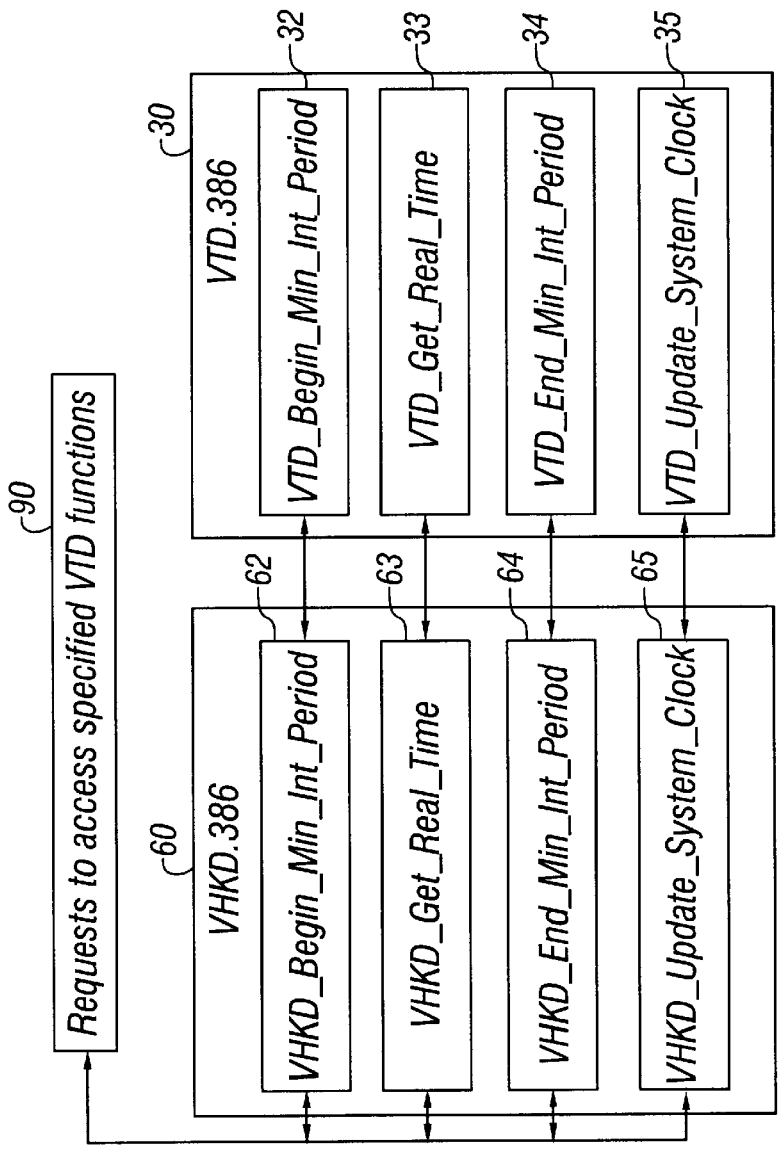
FIG. 2 shows the relationship between the Windows 95 operating system elements and the fast hardware interrupt service routine (fast ISR) for IRQ 0 elements used during normal non-ISR operating system activity and which are contained in the fast hardware interrupt handling module.

FIG. 2 shows functions contained in the VHKD.386 module which support the operation of the Windows 95 operating system while the IRQ 0 fast ISR is installed. All of these functions are installed with the VxD hooking facility, Hook_Device_Service( ) and filter the analogous VTD.386 functions while accepting exactly the same parameters. A VHKD_Begin_Min_Int_Period function (labeled 62) stores all request to change the minimum interrupt period into the MIP array so the IRQ 0 fast ISR code has access to this information at run time. A VHKD_Get_Real_Time function (labeled 63) has access to all of the total timer tick counters in the fast ISR structure and uses this information to provide an accurate real time count. A VHKD_End_Min_Int_Period function (labeled 64) removes structures from the MIP array that are associated with earlier VHKD Begin_Min_Int_Period functions. A VHKD_Update_System_Clock function (labeled 65) uses the total timer tick counters in the fast ISR structure to update the system clock. This would insure that all queries into the system timer would have absolute current information.

Figure 3:
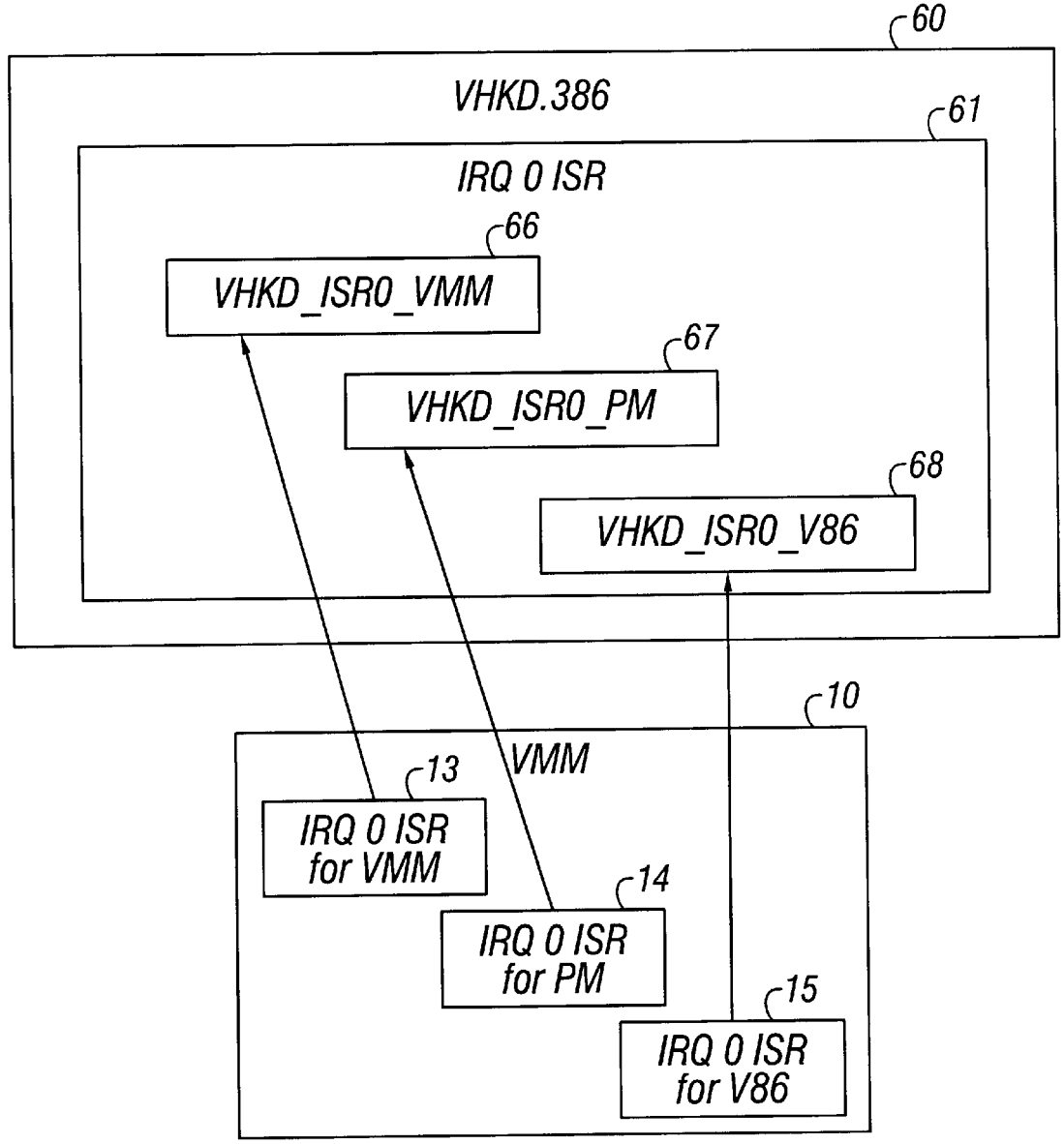
FIG. 3 shows fast ISR for IRQ 0 elements that are contained in the fast hardware interrupt handling module (VHKD.386) and exist to accommodate the multi-mode nature of the Windows 95 operating system.

FIG. 3 shows an important complication for operating systems which support modern multimode microprocessors. The operating systems must create redundant flows for every mode supported by the microprocessor. Hence, the IRQ 0 fast ISR actually consists of a VHKD_ISR0_VMM ISR (labeled 66), a VHKD_ISR0_PM ISR (labeled 67), and a VHKD_ISR0_V86 ISR (labeled 68). The VHKD_ISR0_VMM ISR runs when the virtual machine manager mode is active. The VHKD_ISR0_PM ISR runs when protected mode is active. The VHKD_ISR0_V86 ISR runs when virtual 80x86 mode is active.

Operation

Figure 4:
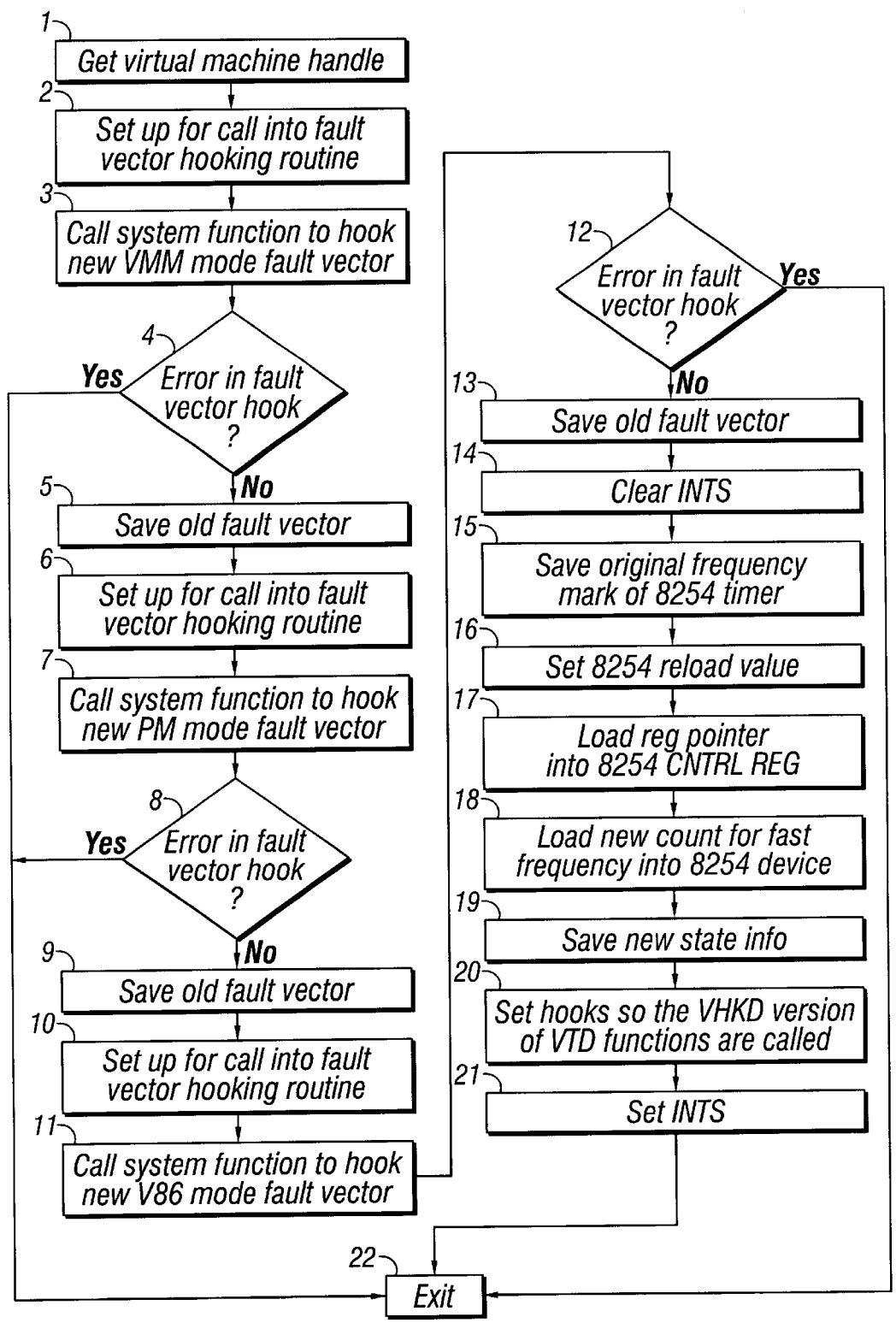
FIG. 4 shows the flow chart for the insertion of the fast ISR for IRQ 0 into the Windows 95 operating system. This flow chart represents the specifics of the code in appendix A, and it does not represent the exact descriptions contained in the specification.

FIG. 4 shows a flow chart for the initialization and insertion process. The initialization routines of the fast hardware interrupt handling module (VHKD.386 (item 60)) must hook the VMM's interrupts which are linked to the desired IRQ line, which is IRQ 0 for this preferred embodiment. This process is described in greated detail below. The VMM's (item 10) vectors for IRQ 0 (item 12) must be replaced with the vectors into VHKD.386. The addresses of VHKD_ISR0_VMM (item 66), VHKD_ISR0_PM (item 67), and VHKD_ISR0_V86 (item 68) are inserted for the old fault vector addresses. The old fault vectors are stored in the fast ISR structure.

Then the 8254 compatible device is setup. This involves saving the timer ticks which were originally programmed into the device. This information is saved in the MIP array and is noted as being the original frequency mark and the current frequency mark.

Information for the fast ISR frequency is retrieved from the fast ISR structure for loading into the 8254 compatible device. The control registers and data registers of the 8254 compatible device are then programmed to interrupt at the fast ISR frequency.

The VTD.386 (item 30) then has several member functions filtered using the Hook_Device_Service( ) function. The VTD_Begin_Min_Int_Period( ) function (item 32) is hooked with the VHKD_Begin_Min_Int_Period( ) function(item 62). The VTD_Get_Real_Time( ) function (item 33) is hooked with the VHKD_Get Real_Time( ) function (item 63). The VTD_End_Min_Int_Period( ) function (item 34) is hooked with the VHKD_End_Min_Int_Period( ) function (item 64). The VTD_Update_System_Clock( ) function (item 35) is hooked with the VHKD_Update_System_Clock( ) function (item 65).

These VHKD.386 support elements are necessary to accommodate an operating system which does not realize that the 8254 compatible device has been reprogrammed. FIG. 6 shows the flow charts of the operation of these support elements.

The VHKD_Begin_Min_Int_Period( ) (FIG. 6A) insures that all minimum interrupt period additions are reflected in the MIP array structure. The procedure converts its parameters, checks validity, adds info to the MIP array, then actually changes the current frequency mark if necessary.

The VHKD_Get_Real_Time( ) (FIG. 6B) insures that all requests to get the system time are answered according to the data in the VHKD.386 data base.

The VHKD_End_Min_Int_Period( ) (FIG. 6C) insures that all minimum interrupt period deletions are reflected in the MIP array structure. The procedure converts its parameters, checks validity, deletes info from the MIP array if necessary, then actually changes the current frequency mark if necessary.

The VHKD_Update_System_Clock( ) (FIG. 6D) insures that updates are done from the VHKD.386 database.

Figure 5:
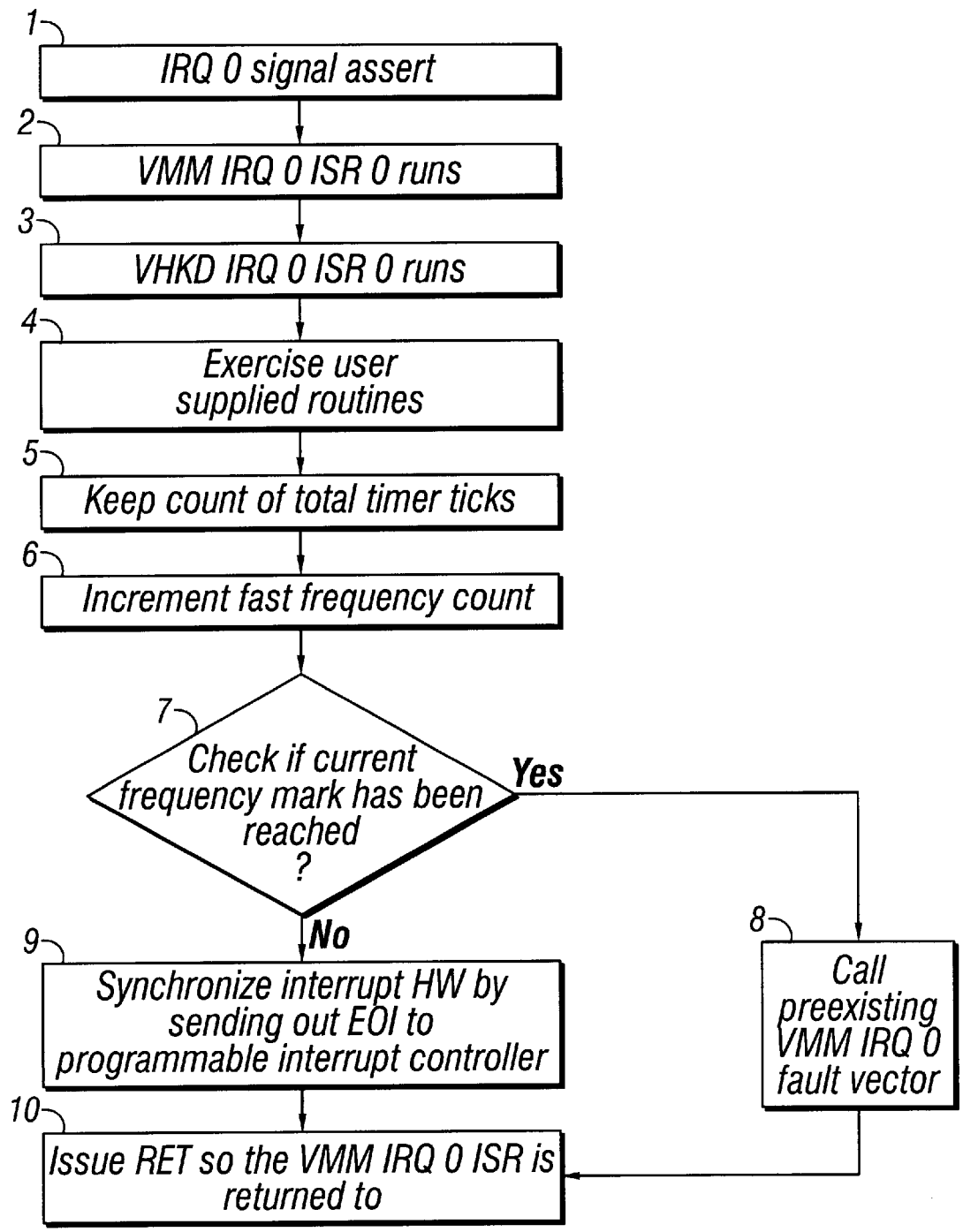
FIG. 5 shows the flow chart for the actual fast ISR for IRQ 0. This flow chart represents the specifics of the code in appendix A, and it does not represent the exact descriptions contained in the specification.
Figure 6A:
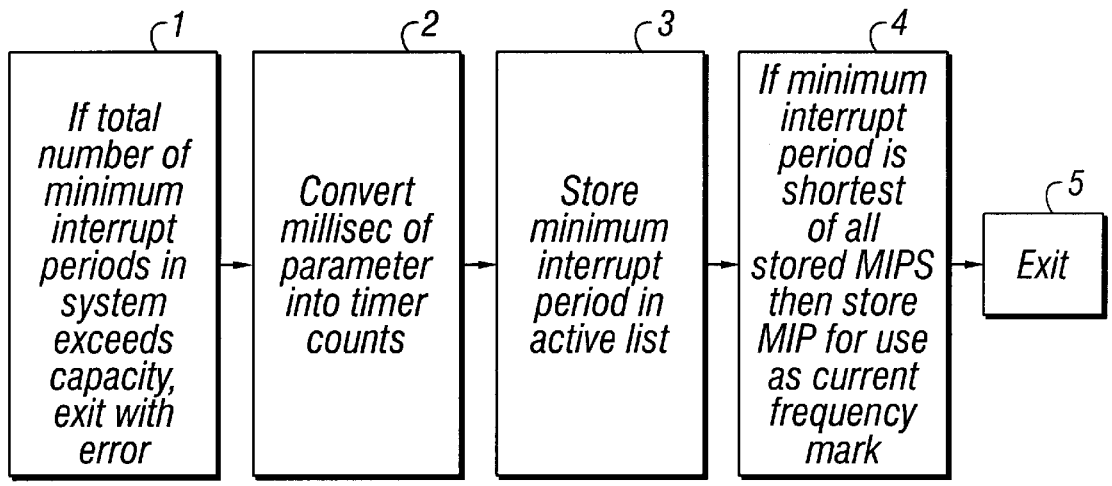
FIGS. 6A–6D shows the flows charts for the various routines that support operation of the Windows 95 operating system while the fast ISR is installed.
Figure 6B:
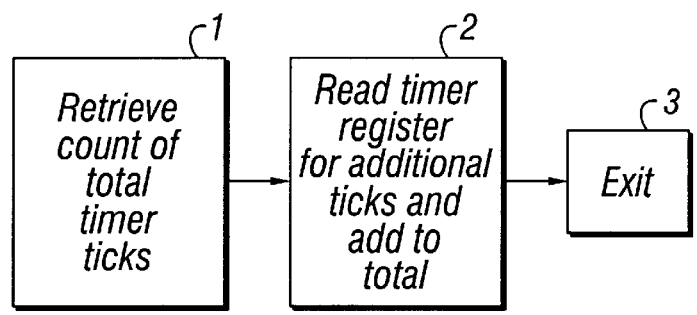
Figure 6C:
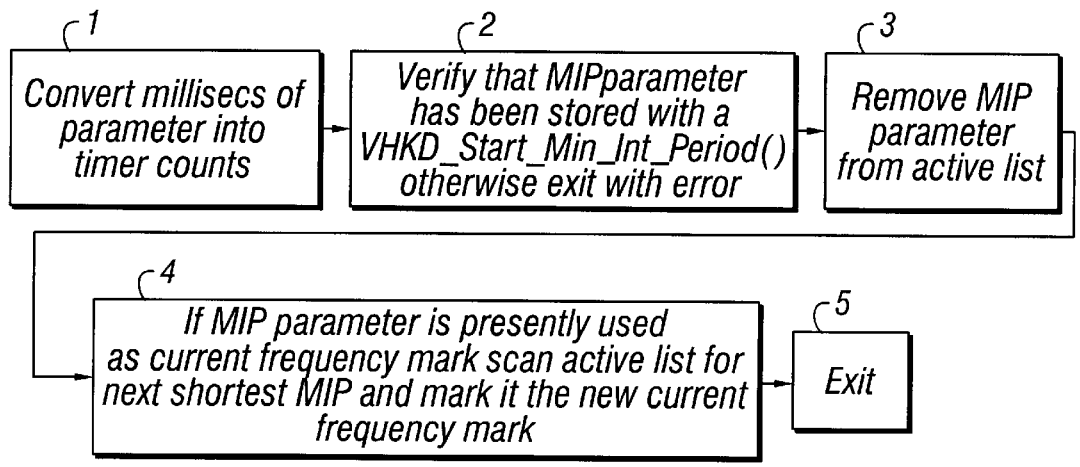
Figure 6D:
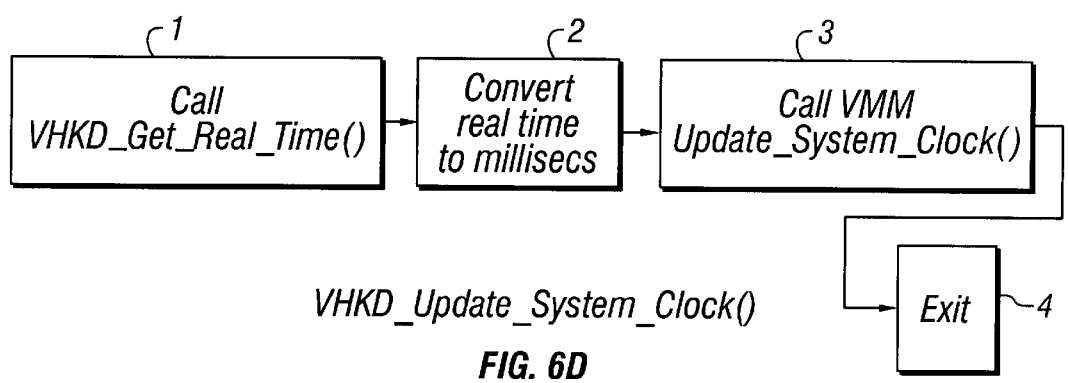

FIG. 5 shows a flow chart of the operation of the actual Win95 fast ISR routines.

Initially, the IRQ ( ) signal precipitates the vector in the interrupt descriptor table (item 11) to be run. Then the VMM fault vector (item 12) runs. Then the VHKD fault vector (item 61) runs.

All of the work occurs in the VHKD.386 fault vector. Initially, the mode of the CPU is noted, then all the structures of the fast ISR structure are updated. The user supplied work routine is then called. This is the routine which, for some reason, needs this extremely fast frequency and low latency environment. One example application might be obtaining data from some high speed device.

The conditional checks are then executed. This involves checking if the current frequency mark has been reached and if we need to call the original vector it is obtained from the fast ISR structure and called. On return, the procedure is exited. If not, the work of the 8259 is done by sending out an EOI to the PIC registers, and then the VMM fault vector is returned to.

Routines by which the core of the present invention can be implemented are annexed hereto and presented in the program listings of appendix A. These listings are written in assembler code for the 80386 series of microprocessors.

An alternative embodiment of this invention is when the fault vector is hooked into an IRQ's other than IRQ 0. This embodiment differs because IRQ 0 is unique in that for the PC architecture it is always wired to the 8254 compatible device. Hence, a main difference in the description between the embodiment for fast interrupt service routine hooked into an IRQ other than IRQ 0 is that the VTD.386 (see FIG. 1, item 30) is not part of the system, nor are the support elements, (see FIG. 2, items 62–65).

The difference in the operation between this embodiment and the main embodiment is that no algorithms are needed to do any calculations when the original vector needs to be called, and is that no manipulation of the 8254 compatible device is done.

Another embodiment involves the extension of the fast ISR structure to allow for information to be acquired during the fast ISR and then transferred to the regular ISR or further upstream to the deferred procedure call. This requires an inter module extension to the fast ISR structure for storage of the information, and it requires a mechanism for passing the address space information to the upstream ISR of DPC.

This setup is done by the fast ISR module providing a service to inform the upstream modules which will be receiving the fast ISR information of the address of this information. This is accomplished by calling a setup routine. Protection mechanisms are set up for accessing this information. In Windows 95, it is protected by a mutex, and in Windows NT, it is protected by a spin lock.

When the fast ISR occurs, the appropriate information is placed in the fast ISR structure inter module extension. The information can be in the form of linked queues or structure information. The upstream ISR or upstream DPC routine must check the fast ISR structure inter module extension for the availability of this information.

Another embodiment of the fast ISR, but one of the most useful, is the creation of high resolution timers for the Windows 95 or Windows NT environment. This requires an additional array similar to the MIP array, which contains structures similar to the MIP structure. A timer array is created which holds a timer structure. The timer structure hold the timer ticks associated with the timer, and if the timer is one shot or continuous.

The timer structures are created and filled on a conditional basis as a function of the desired timer interrupt. The information filled in includes when the timer is supposed to go off. This information is in units of system clock counts. It also includes call back routines which are called when the timer is supposed to go off, and the information on whether the timer is one shot or continuous. The time is in units of nano seconds, and the guaranteed resolution is 500 nanoseconds. This structure is examined and acted upon during the fast ISR execution.

SUMMARY, RAMIFICATIONS, AND SCOPE

Accordingly, the reader will see that this invention can greatly reduce the latency of a hardware interrupt service routine in personal computers running a Microsoft protected mode operating system, and that this invention greatly reduces the overhead in a hardware interrupt service routine. With these operating system modifications and extensions, users can now do real time sensitive work. For example, the user can acquire real time data in a more efficient manner. The user can generate event notifications that are more accurate.

Although the description above contains many specificities, these should not be construed as limiting the scope of the invention but as merely providing illustrations of some of the presently preferred embodiments of this invention. As further example, multiple fast ISRs can exist by merely creating an array of fast ISR structures, and fast ISRs can be inserted dynamically. Also, the Microsoft Windows NT protected mode operating system provides substantially the same set of modules and interfaces, which means all of the above specificities apply to it. Further, a Win32 Driver Model version can be created by insuring all the services offered by this invention are accessible from a Win32 Driver Model driver, etc.

Thus the scope of the invention should be determined by the appended claims and their legal equivalents, rather than by the examples given.

I claim:

1. An apparatus comprising:

a computer having a memory and execution of which is controlled by an operating system having a kernel portion which supports separate device drivers which provide hardware interrupt service routines, said kernel portion controlling said computer to export services to hook interrupt service routines mapped into an interrupt descriptor table, said operating system having the ability to load device drivers and having a kernel module which controls said computer at boot time to load an interrupt descriptor table with vectors to specific kernel interrupt service routines thereby hooking said interrupts, each said interrupt service routine having stored therein a vector to another module in the kernel of said operating system, said kernel module also providing a programmatic interface having at least one hooking function which can be invoked to change said vectors in said interrupt service routines to point to any specified address, said computer also being controlled to perform the following functions:

cause said operating system to insert into said memory a module, hereinafter referred to as the fast hardware interrupt handling module, which includes a routine, hereinafter referred to as the fast hardware interrupt service routine, said fast hardware interrupt handling module controlling said computer to invoke said hooking function so as to change at least one vector in at least one specific kernel interrupt service routine to point to said fast hardware interrupt service routine, said fast hardware interrupt handling module having program code, hereinafter referred to as fast program code, for controlling said computer to transfer control to a user specified program for handling a specified interrupt;

wherein said operating system includes a module, hereinafter referred to as the slow hardware interrupt handling module, that has program code, hereinafter referred to as slow program code, capable of controlling said computer to transfer control to said user specified program for handling said specified interrupt, wherein said fast program code bypasses said slow program code and controls said computer to transfer control to said user specified program with lower latency than does said slow program code.

2. The apparatus of claim 1 wherein said operating system controls said computer to have at least two different modes of microprocessor operation, and wherein said kernel module includes a different kernel interrupt service routine for each said mode and wherein said programmatic interface includes at least one hooking function for each said different kernel interrupt service routine, and wherein said kernel module controls said computer at boot time to load said interrupt descriptor table with vectors to said different kernel interrupt service routines, the vector used depending upon the mode of operation, and wherein said fast hardware interrupt handling module includes at least one fast hardware interrupt service routines for each mode and controls said computer to invoke all of the hooking functions for all of the modes so as to load a vector into each said kernel interrupt service routines which points to at least one of said fast hardware interrupt service routines for a corresponding mode of operation.

3. A process carried out in a computer having a memory, execution of said computer being controlled by operating system which has a kernel portion which supports separate device drivers which provide hardware interrupt service routines, said kernel portion controlling said computer to export services to hook interrupt service routines mapped to an interrupt descriptor table, said operating system also controlling said computer to load device drivers, said operating system kernel portion having a kernel module which controls said computer at boot time to load an interrupt descriptor table with vectors to specific kernel interrupt service routines thereby hooking interrupts, each said interrupt service routine having stored therein a vector to another module in the kernel of said operating system, said kernel module also providing a programmatic interface having at least one hooking function which can be invoked to change said vectors in said interrupt service routines to point to any specified address, the improvement comprising:

controlling said operating system so as to control the computer to insert into said memory a fast hardware interrupt handling module which includes a fast hardware interrupt service routine, to thereby obtain lowered latency by bypassing a module of said operating system, hereinafter referred to as the slow hardware interrupt handling module, that arbitrates what entities can access said interrupts;

controlling said computer using said fast hardware interrupt handling module to invoke said hooking function so as to change at least one vector in at least one specific kernel interrupt service routine to point to said fast hardware interrupt service routine; and controlling said computer using code in said fast hardware interrupt handling module so as to transfer control to a user specified program for handling a specified interrupt.

4. An apparatus comprising:

a software module which runs in a kernel mode on a personal computer having any Microsoft Windows protected mode operating system which performs the following functions:

cause said Microsoft Windows protected mode operating system to insert a routine, hereinafter referred to as the fast hardware interrupt service routine, said insertion being done in a manner which allows said fast hardware interrupt service routine to run prior to all other kernel code except any virtual machine manager type code which loads an interrupt descriptor table;

cause said Microsoft Windows protected mode operating system to insert said fast hardware interrupt service routine for every mode of a microprocessor of said computer which is supported by said Microsoft Windows protected mode operating system;

cause said fast hardware interrupt service routine to transfer control to other code supplied by a user to handle a designated device;

whereby, due to said fast hardware interrupt service routine, a computer running a Microsoft Windows protected mode operating system can service hardware interrupts with a much shorter latency from the occurrence of hardware interrupt signal to execution of interrupt service routine as compared to servicing hardware interrupts using a facility provided by the Microsoft Windows protected mode operating system without using said fast hardware interrupt service routine.

5. A process carried out in a software module which runs in a kernel mode on a personal computer having any Microsoft Windows protected mode operating system which contains the following improvements comprising:

controlling said Microsoft Windows protected mode operating system to insert a fast hardware interrupt service routine, said insertion being done in a manner which allows said fast hardware interrupt service routine to run prior to all other kernel code except any virtual machine manager type code which loads an interrupt descriptor table;

controlling said Microsoft Windows protected mode operating system to insert said fast hardware interrupt service routine for every mode which a microprocessor of said computer which is supported by said Microsoft Windows protected mode operating system;

controlling said fast hardware interrupt service routine to transfer control to other code supplied by a user to handle a designated device;

whereby a computer running a Microsoft Windows protected mode operating system has a much shorter latency from the occurrence of hardware interrupt signal to hardware interrupt service routine execution as compared to latency obtained from using a facility provided by said operating system without using said fast hardware interrupt service routine.

6. A method for decreasing the latency of hardware interrupt service routines and decreasing the overhead of hardware interrupt service routines in computers using virtual machine manager type services such as those provided by the Microsoft Windows operating systems for protected mode microprocessors, comprising the steps of invoking the software interrupt hooking services of the Windows protected mode operating systems to hook hardware interrupts such that fast hardware interrupt service routines provided by a user can be executed before other kernel modules which would normally be executed before any user supplied interrupt service routine is executed to thereby decrease latency.

7. The apparatus of claim 4, with said computer also being controlled to perform the following functions:

cause a varying in the rate at which a hardware interrupt from an internal programmable timer occurs when the hardware interrupt is hardware IRQ 0 thereby providing an environment where interrupt service routines can run at significantly higher frequencies than is normally achieved with standard Microsoft Windows protected mode operating system hardware interrupt service routine processing;

cause an overriding any kernel programmatic interfaces whose return value would return erroneous information caused by the process of modifying the rate at which said IRQ 0 hardware interrupt occurs;

cause a storing all information about the original settings of said internal programmable timer prior to changing the rate of IRQ 0 hardware interrupts;

whereby providing an environment where the hardware interrupt service routines for the internal programmable interrupt timer can run at significantly higher frequencies than is normally achieved with standard Microsoft Windows protected mode operating system hardware interrupt service routine processing.

8. The process of claim 5, further including the following improvements:

controlling the rate at which a hardware interrupt from an internal programmable timer occurs when the hardware interrupt is hardware IRQ 0 thereby providing an environment where interrupt service routines can run at significantly higher frequencies than is normally achieved with standard Microsoft Windows protected mode operating system hardware interrupt service routine processing;

overriding any kernel programmatic interfaces whose return value would return erroneous information caused by the process of modifying the rate at which said IRQ 0 hardware interrupt occurs;

storing all information about the original settings of said internal programmable timer prior to changing the rate of IRQ 0 hardware interrupts;

whereby providing an environment where the hardware interrupt service routines for the internal programmable interrupt timer can run at significantly higher frequencies than is normally achieved with standard Microsoft Windows protected mode operating system hardware interrupt service routine processing.

9. The apparatus of claim 4, with said computer also being controlled to perform the following functions:

cause the creation of a set of storage structures for inter module communication which the fast interrupt service routine can use to store information needed by other kernel modules and which allow for access by normal interrupt service routines and deferred procedure calls and which maintain protection against race conditions when said other kernel modules access said set of storage structures for inter module communication;

cause the creation of handles to the said set of storage structures for inter module communication and the creation of a mechanism for said other kernel modules to obtain said handles;

whereby said device driver providing fast interrupt service routine capabilities can convey information to other kernel modules in the system.

10. The process of claim 5, further including the following improvements:

creating a set of storage structures for inter module communication which the fast interrupt service routine can use to store information needed by other kernel modules and which allow for access by normal interrupt service routines and deferred procedure calls and which maintain protection against race conditions when said other kernel modules access said set of storage structures for inter module communication;

providing a means for allowing said other kernel modules to obtain handles which provide access to the said set of storage structure for inter module communication;

whereby said device driver providing fast interrupt service routine capabilities can convey information to other kernel modules in the system.

11. The apparatus of claim 7, with said computer also being controlled to perform the following functions:

cause the exporting via a programmatic interface at least one function which can be invoked by a function call to said programmatic interface to establish a user defined time at which a notification conveyance mechanism specified as an argument in the function call actually starts executing;

cause the creation of a storage place for information about said notification conveyance mechanism and invocation time;

cause the creation of a mechanism to allow a user to fill said storage place;

cause the updating information in the said storage place as a function of said fast interrupt service routine;

whereby said personal computer running a Microsoft Windows protected mode operating system protected mode operating system will provide the ability of notification conveyance mechanisms to be activated with far greater accuracy than could be achieved with standard Microsoft Windows protected mode operating system hardware interrupt service routine installation procedures.

12. The process of claim 8, further including the following improvements:

exporting via a programmatic interface at least one function which can be invoked by a function call to said programmatic interface to establish a user defined time at which a notification conveyance mechanism specified as an argument in the function call actually starts executing;

creating a mechanism to allow a user to fill said set of storage place;

updating information in said storage place as a function of said fast interrupt service routine;

whereby said personal computer running a Microsoft Windows protected mode operating system will provide the ability of notification conveyance mechanisms to be activated with far greater accuracy than could be achieved with standard Microsoft Windows protected mode operating system hardware interrupt service routine installation procedures.

13. An apparatus comprising:

a memory;

a processor coupled to the memory;

a first hardware interrupt handling module that, for a multi mode Windows operating system, includes services for hooking of hardware interrupts and arbitrates what entities can access said hardware interrupts, wherein said services are for requesting that, in response to assertion of user designated hardware interrupts, corresponding user specified programs be executed; and a second hardware interrupt handling module, for operation in said multi mode Windows operating system, that bypasses said first hardware interrupt handling module to hook a hardware interrupt to cause execution of a user specified program in response to assertion of a corresponding user designated hardware interrupt, wherein said second hardware interrupt handling module obtains lower latency than would have been obtained by said first hardware interrupt handling module, had said first hardware interrupt handling module not been bypassed in connection with said user specified program.

14. The apparatus of claim 13 wherein:

said second hardware interrupt handling module is configured to execute said user specified program before executing some system software; and had said first hardware interrupt handling module not been bypassed in connection with said user specified program, and had said services been used to request that, in response to assertion of said user designated hardware interrupt, said user specified program be executed, then said first hardware interrupt handling module would have executed said some system software before executing said user specified program.

15. The apparatus of claim 14 wherein said first hardware interrupt handling module is a virtual programmable interrupt controller device and said some system software is programmable interrupt controller software.

16. The apparatus of claim 13 wherein said first hardware interrupt handling module is a virtual programmable interrupt processing device.

17. The apparatus of claim 13 wherein the multi mode Windows operating system includes the first hardware interrupt handling module and provides no documented services, other than said services of said first hardware interrupt handling module, for hooking hardware interrupts for requesting execution of user specified programs in response to assertion of user designated hardware interrupts.

18. The apparatus of claim 13 wherein said second hardware interrupt handling module is configured to pass control to said first hardware interrupt handling module after execution of said user specified program.

19. The apparatus of claim 13 wherein said first hardware interrupt handling module is bypassed using a Windows kernel fault hooking function.

\* \* \* \* \*